United States Patent
Scarborough

(10) Patent No.: US 7,086,174 B2
(45) Date of Patent: Aug. 8, 2006

(54) TAPE MEASURE THAT INCORPORATES A BELT TYPE MARKING DEVICE

(75) Inventor: Dane Scarborough, Hailey, ID (US)

(73) Assignee: Irwin Industrial Tool Company, Huntersville, NC (US)

( * ) Notice: Subject to any disclaimer, the term of this patent is extended or adjusted under 35 U.S.C. 154(b) by 0 days.

(21) Appl. No.: 11/104,308

(22) Filed: Apr. 11, 2005

(65) Prior Publication Data

US 2005/0198850 A1    Sep. 15, 2005

Related U.S. Application Data

(63) Continuation-in-part of application No. 10/758,387, filed on Jan. 14, 2004, now Pat. No. 6,941,672.

(51) Int. Cl.
    *G01B 3/10*    (2006.01)
(52) U.S. Cl. ............................ 33/761; 33/770; 33/768; 33/668; 33/34; 33/37
(58) Field of Classification Search .......... 33/759–762, 33/765–766, 768–770, 668, 42, 34–39.1
    See application file for complete search history.

(56) References Cited

U.S. PATENT DOCUMENTS

| 491,715 | A |   | 2/1893 | Mondor |
| 4,970,952 | A | * | 11/1990 | Hiraga et al. ................ 101/111 |
| 5,416,978 | A | * | 5/1995 | Kaufman ...................... 33/770 |
| 6,612,046 | B1 | * | 9/2003 | Cimorell et al. .............. 33/668 |
| 6,892,469 | B1 | * | 5/2005 | Tufts et al. ................... 33/768 |

OTHER PUBLICATIONS

First Office Action from Chinese Examiner for Chinese Application No. 02828208.6 corresponding to this pending U.S. Application, dated Aug. 22, 2005 (Chinese Version and English translation enclosed).

* cited by examiner

*Primary Examiner*—Yaritza Guadalupe
(74) *Attorney, Agent, or Firm*—Dennis J. Williamson; Moore And Van Allen, PLLC

(57) ABSTRACT

A tape measure that incorporates a marking device for allowing an individual to measure and mark a wide variety of materials in a more efficient and economical manner, and for measuring and marking the beginning point of reference and the measured position point simultaneously. The tape measure has a housing, a coiled measuring tape, a tape tip, and a marker having a marking wheel mounted on an axle. The marking wheel having a belt configured for transferring a powdered marking substance, such as chalk, to the surface to be measured and marked.

18 Claims, 2 Drawing Sheets

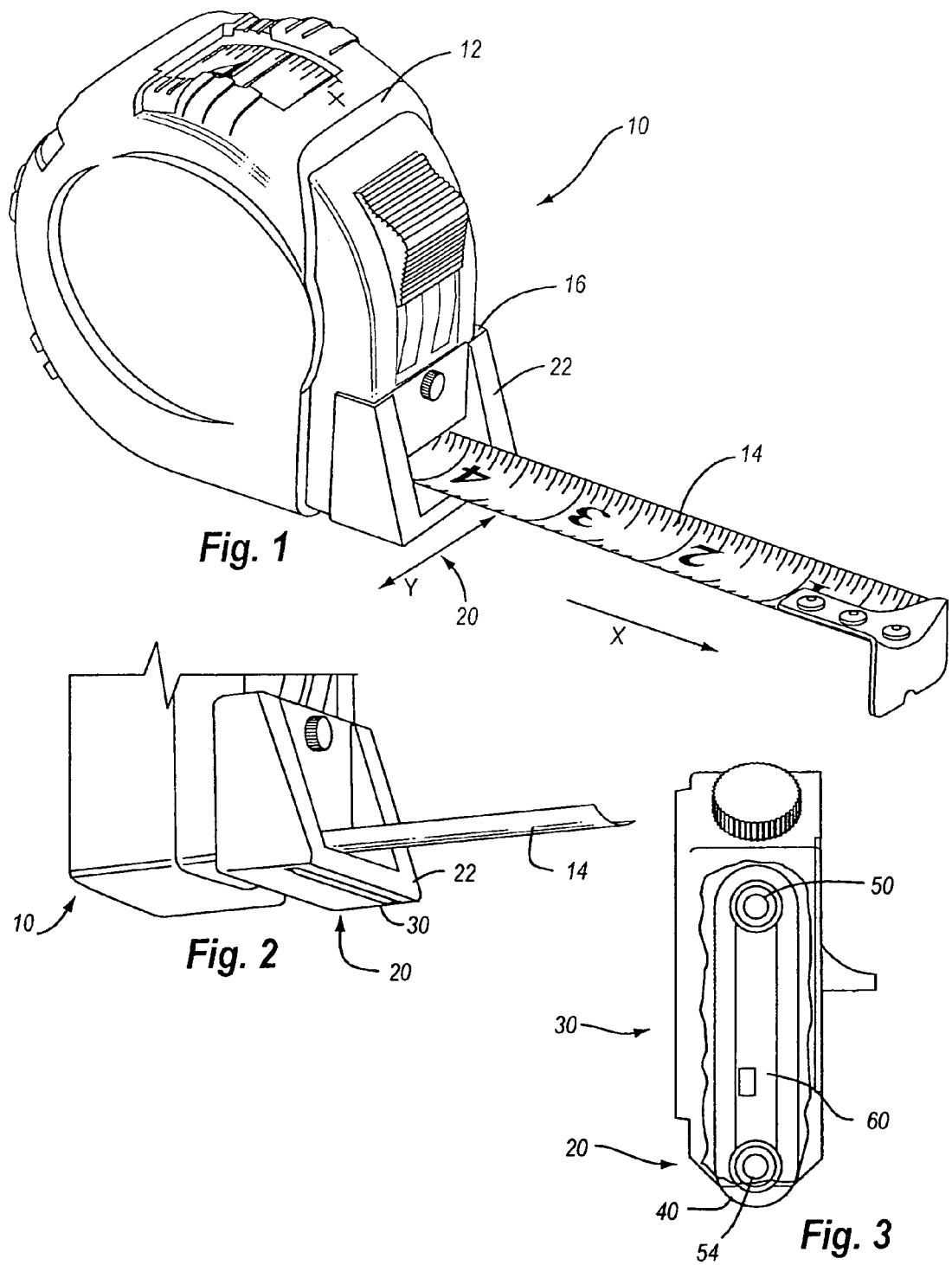

TAPE MEASURE THAT INCORPORATES A BELT TYPE MARKING DEVICE

PRIORITY

This application is a continuation-in-part application which claims the priority date of the application entitled Tape Measure That Incorporates a Wheeled Marking Device for Applying a Marking Indicia filed by Dane Scarborough on Jan. 14, 2004 with application Ser. No. 10/758,387 now U.S. Pat. No. 6,941,672 which claims priority from the application entitled Tape Measure That Incorporates a Marking Device filed by Dane Scarborough on Jan. 6, 2004 with application Ser. No. 10/753,924. Application Ser. No. 10/758,387 claims the priority date of the application entitled Tape Measure That Incorporates a Marking Device filed by Dane Scarborough on Jul. 15, 2002 with application Ser. No. 10/195,924 (U.S. Pat. No. 6,698,104), the application entitled Tape Measure That Incorporates a Marking Device filed by Dane Scarborough on Jul. 15, 2002 with application Ser. No. 10/195,945 (U.S. Pat. No. 6,701,635), and the application entitled Dual Based Tape Measure filed by Dane Scarborough on Jul. 15, 2002 with application Ser. No. 10/196,984 (U.S. Pat. No. 6,637,125). Application Ser. No. 10/753,924 claims the priority date of the application entitled Tape Measure That Incorporates a Marking Device filed by Dane Scarborough on Jul. 15, 2002 with application Ser. No. 10/195,924 (U.S. Pat. No. 6,698,104), the application entitled Tape Measure That Incorporates a Marking Device filed by Dane Scarborough on Jul. 15, 2002 with application Ser. No. 10/195,945 (U.S. Pat. No. 6,701,635), and the application entitled Tape Measure That Incorporates a Directional Marking Device filed by Dane Scarborough on Jul. 15, 2002 with application Ser. No. 10/197,050 (U.S. Pat. No. 6,701,636). All of which claim the priority dates of the provisional application entitled Tape Measure That Incorporates a Marking Device filed by Dane Scarborough on Dec. 18, 2001 with application Ser. No. 60/342,146 and the provisional application entitled Tape Measure That Incorporates a Marking Device filed by Dane Scarborough on Feb. 28, 2002 with application Ser. No. 60/360,698. The disclosures of these applications are incorporated herein.

BACKGROUND OF THE INVENTION

1. Field of the Invention

The present invention generally relates to measuring devices and more specifically it relates to a tape measure that incorporates a marking device for allowing an individual to measure and mark a wide variety of materials in a more efficient and economical manner.

2. Description of the Prior Art

Various different forms and types of measuring devices are known to the prior art. One particular type of measuring device is known as a "tape measure." Tape measures typically comprise a flexible tape resiliently coiled within a housing. The tape is normally printed with incremental measuring marks for measuring distances. In use, the flexible tape is uncoiled and extended from the housing and placed on a surface to be measured. Distances can then be marked with a separate marking tool, such as a pencil, directly onto the surface measured.

Numerous devices incorporating marking tools inside and outside the tape measure housing are known in the prior art. These include devices that are affixed to existing tape measure housings, for instance, the self-adhesive scoring attachment of U.S. Pat. No. 6,041,513 (Doak). These devices also include marking tools, which are affixed to belt clips of existing tape measure housings. For example, U.S. Pat. No. 4,760,648 (Doak, et al.) discloses a marking device adapted to be mounted on one side of the tape measure, namely as a replacement belt clip.

These devices also include housings configured for receipt therethrough of marking means, such as pencils or pens. In one example, U.S. Pat. No. 5,735,052 (Lin) discloses a tape measure having formed therein a passage for receiving therethrough the marking means.

These devices also include marking tools, which are integral with the tape measure housing. For instance, U.S. Pat. No. 5,435,074 (Holevas, et al.) discloses a tape measure having a marker attached to the tape measure's lock so that depression of the lock mechanism also extends the marker out of the housing of the tape measure. Also, U.S. Pat. No. 4,015,337 (Taylor) discloses a marking device integrally formed into the housing of the tape measure.

These devices can also include scoring means rather than marking (ink, graphite, etc.) means. For instance, U.S. Pat. No. 2,649,787 (Kobayashi), U.S. Pat. No. 3,063,157 (Keene), and U.S. Pat. No. 3,526,964 (Clark, Jr.).

One problem with many of these conventional measuring devices is the number of procedures required to complete the task of measuring and marking materials accurately. Many of these prior art devices require that the tape measure blade be locked into position prior to the use of the marking device. For instance, the patent to Holevas, et al. discussed above. Such use can require additional digital manipulation of the tape measure, and due to the contact of the locking mechanism to the blade, can cause the tape measure blade to shift from the desired position thereby causing inaccuracies.

Other problems with conventional measuring devices are their size and complexity. Many prior art devices have protrusions that inhibit or eliminate the ability to carry the tape measure in the standard pouch or holder that is often provided on a carpenter's or tradesmen's tool belt. Furthermore, if the tip of the marking instrument is exposed, it can cause damage or harm to other objects or it can be damaged itself.

What is needed is a tape measure or a marking device that is able to be utilized with a tape measure, which is readily able to allow an individual to measure and mark a wide variety of materials in an efficient and economical manner; requires little to no maintenance; is not prone to inaccuracy; is versatile; is simple to use; is compact and not awkwardly shaped; and/or is not prone to damage when in or out of use.

In these respects, a tape measure that incorporates a marking device according to the present invention substantially departs from the conventional concepts and designs of the prior art, and in so doing provides an apparatus primarily developed for some, if not all, of the above needs.

SUMMARY OF THE INVENTION

In view of the foregoing disadvantages inherent in the known types of measuring devices found in the prior art, the present invention provides a new tape measure that incorporates a marking device construction wherein the same can be utilized for allowing an individual to measure and mark a wide variety of materials in a more efficient and economical manner.

The general purpose of the present invention, which will be described subsequently in greater detail, is to provide a new tape measure that improves on the teachings of the prior art. In doing so, the present invention has many of the advantages of the measuring devices mentioned heretofore, and many novel features. The result is a new tape measure that incorporates a marking device which is not anticipated, rendered obvious, suggested, or even implied by any of the prior art measuring devices, either alone or in any combination thereof.

The preferred embodiment of the present invention generally comprises a housing, a coiled measuring tape, a tape tip, and a marker (or "marking device") for applying a mark to a surface to be measured and marked.

In the preferred embodiment claimed within this application, the housing is preferably an elongated square or cylindrical shape or a combination thereof, having opposed sidewalls, a top wall, a bottom wall, a rear wall, and a front wall defining an enclosure. The front wall having therethrough a tape blade aperture.

The coiled measuring tape is preferably an elongated blade formed of a ribbon of metal or composite material coiled on a means for a spool with a means to retract. The tape tip of the measuring tape attaches to the end of the measuring tape and preferably comprises a means for hooking, including a hook portion that extends at an essentially right angle from the mounting portion of the tape tip.

The marking portion on the housing preferably comprises an elastic belt. This belt configured for being covered in a powdered marking substance (generically referred to herein as "chalk"). The tape measure is configured to roll or otherwise create a line on the surface to be measured and marked. This line is preferably generally perpendicular to the direction the tape is extended out of the tape case. This line preferably relating to a measurement on the tape measure so that a user could create a chalk line mark at a desired measurement thereby providing a line to later cut or otherwise use.

The enclosure enclosing the marking device/portion can be a separate component, which is fixedly or releaseably attached to the housing of the tape measure, or could be integral to the tape measure housing itself. The enclosure preferably has a protruding cursor that is in alignment with the elastic belt and perpendicular to the tape (as extended). As such, the elastic belt is configured to leave a powdered marking substance mark, which is perpendicular to the direction the tape blade is extended.

There has thus been outlined, rather broadly, the more important features of the invention so that the detailed description thereof may be better understood and so that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting. For instance, using "elastic" is not intended to limit the concept to only cover "elastic," but to also cover related equivalents, as obvious and as discussed herein.

A primary object of the present invention is to provide a tape measure that incorporates a marking device that will overcome the shortcomings of the prior art devices, preferably either through an improved tape measure or an attachment for an existing tape measure.

An object of the present invention is to provide a tape measure that incorporates a marking device for allowing an individual to measure and mark a wide variety of materials in a more efficient and economical manner.

Another object is to provide a tape measure that incorporates a marking device that is directional by nature when engaged with a surface to be measured.

Another object is to provide a tape measure that incorporates a marking device that can measure and mark with one hand operation in a single economical movement.

Another object is to provide a tape measure that incorporates a marking device that once engaged with the material being measured, will accurately hold its position while the mark is being made without the use of an optional mechanical locking device.

Another object is to provide a tape measure that incorporates a marking device that can fit into a common tape pouch or holder on a carpenter's tool belt.

Another object is to provide a tape measure that incorporates a marking device that can engage and mark the material to be measured and marked without damaging the material to be marked.

To the accomplishment of the above and related objects, embodiments of this invention may be embodied in the form illustrated in the accompanying drawings, attention being called to the fact, however, that the drawings are illustrative only, and that changes may be made in the specific construction illustrated. Embodiments of the present invention accomplish one or more of the above purposes.

Further, the purpose of the foregoing abstract is to enable the United States Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

BRIEF DESCRIPTION OF THE DRAWINGS

Various other objects, features and advantages of the present invention will become fully appreciated as the same becomes better understood when considered in conjunction with the accompanying drawings, in which like reference characters designate the same or similar parts throughout the several views.

FIG. 1 is a side view of one embodiment of the present invention.

FIG. 2 is a partial perspective view of the embodiment of FIG. 1.

FIG. 3 is a partial, front side view of a second embodiment of the present invention.

DESCRIPTION OF THE PREFERRED EMBODIMENT

Figure 4:
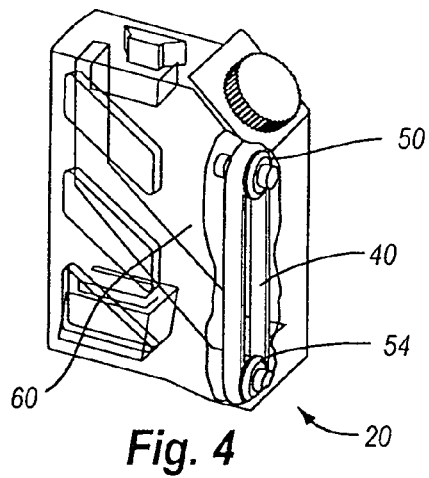
FIG. 4 is a partial, perspective view of the embodiment of FIG. 3.
Figure 5:
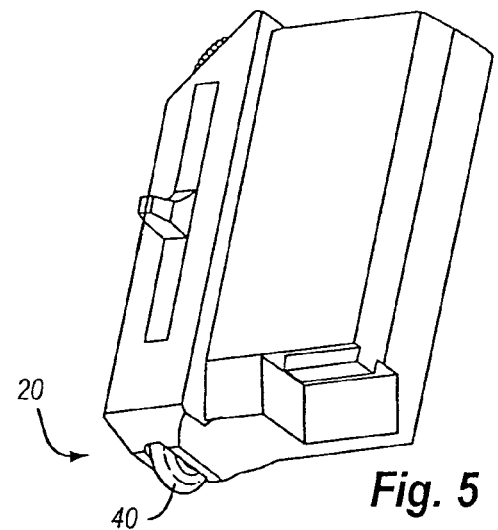
FIG. 5 is a partial, perspective view of a third embodiment of the present invention.
Figure 6:
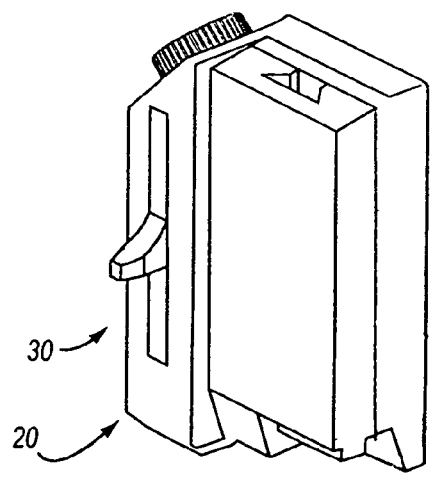
FIG. 6 is a second partial, perspective view of the embodiment of FIG. 5.

While the invention is susceptible of various modifications and alternative constructions, certain illustrated embodiments thereof have been shown in the drawings and will be described below in detail. It should be understood, however, that there is no intention to limit the invention to the specific forms or embodiments disclosed, but, on the contrary, the invention is to cover all modifications, alternative constructions, and equivalents falling within the spirit and scope of the invention as defined in the claims.

Many different types and embodiments of marking devices are disclosed in my other patents and patent applications, including U.S. Pat. No. 6,698,104 titled TAPE MEASURE THAT INCORPORATES A MARKING DEVICE which issued on Mar. 2, 2004, U.S. Pat. No. 6,701,635 titled TAPE MEASURE THAT INCORPORATES A MARKING DEVICE which issued on Mar. 9, 2004, U.S. Pat. No. 6,637,125 titled DUAL BASED TAPE MEASURE which issued on Oct. 28, 2003, U.S. Pat. No. 6,701,636 titled TAPE MEASURE THAT INCORPORATES A DIRECTIONAL MARKING DEVICE which issued on Mar. 9, 2004, U.S. application Ser. No. 10/753,924 titled TAPE MEASURE THAT INCORPORATES A MARKING DEVICE which was filed on Jan. 6, 2004, U.S. application Ser. No. 10/758,387 titled TAPE MEASURE THAT INCORPORATES A WHEELED MARKING DEVICE FOR APPLYING A MARKING INDICIA which was filed on Jan. 14, 2004, U.S. application Ser. No. 10/785,605 titled TOP READ MARKING TAPE MEASURE which was filed on Feb. 23, 2004, and U.S. Application No. 60/547,258 titled TAPE MEASURE THAT INCORPORATES A CHALK LINE STYLE MARKING DEVICE which was filed on Feb. 23, 2004, the disclosures of which are incorporated herein.

Referring initially to FIGS. 1 and 2, shown is one embodiment of a tape measure 10 bearing the invented marking device 20. This marking device 20, having a body 22, being either integral to the tape measure's case 12, an add-on that is able to be attached and detached from the tape measure's case 12, etc. The tape measure 10 having an orifice defined in the front 16 of the tape case 12 for allowing a blade 14 bearing measuring indicia to extend therefrom in a first direction X.

The present invention's marking device 20 is configured for applying a mark in a second direction Y to a surface to be measured and marked generally perpendicular to the first direction X. As such, a user could measure a desired length along direction X and make a mark along direction Y by moving the tape measure sideways or side-to-side.

It is preferred (and shown in the drawings) that the directional marking device 30 comprise a belt 40 extending between at least one upper wheel and at least one lower wheel. FIGS. 3–6 show dual-wheel embodiments (upper wheel 50 and lower wheel 54), whereas FIGS. 1 and 2 show quad-wheel embodiments (upper wheels 50, 52 and lower wheels 54, 56). It would be possible to have more than one belt as well. For instance, the quad-wheel embodiment could essentially comprise two dual-wheel embodiments.

While it is preferred that the present invention's belt(s) 40 comprise an elastic O-ring, obviously other "belts" could be used, including, but not limited to string, nylon, composite, thread, cord, rubber, plastic, leather, cat gut, composites, fabrics, textiles, twine, bands, cable, rubber, latex, elastic, wire, chain, etc. The belt is preferably a closed loop, however, an open loop belt spooled between a pair of spools (for instance) is likewise envisioned.

In the embodiment shown in FIGS. 3 and 4, the belt 40 extends around an upper wheel 50 and a lower wheel 54, the belt 40 traveling through the powdered marking substance chamber 60 thereby picking up powdered marking substance thereon (the powdered marking substance, such as chalk, sticks to the belt). This powdered marking substance can then be rolled onto the surface to be marked through manipulation of the lower wheel and belt along the surface to be moved, thereby creating a line on the surface.

It is preferred that the lower wheel 54 have a generally C-shaped channel therein for receiving the belt. As such, the elastic belt extends partially therefrom so as to apply the chalk (or other marking indicia) to the surface to be marked.

Figure 7:
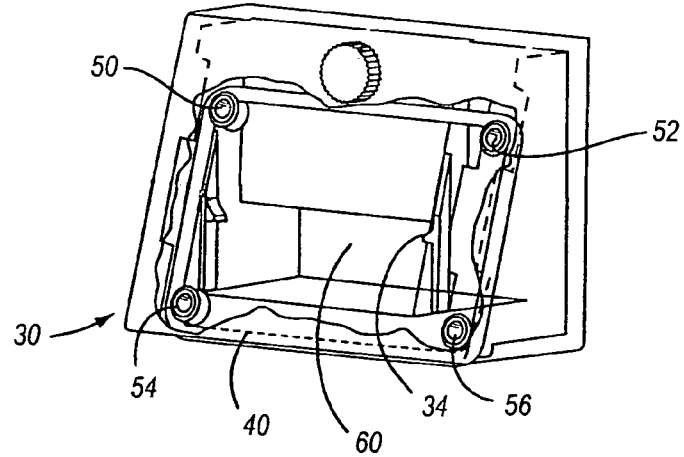
FIG. 7 is a partial, perspective view of a fourth embodiment of the present invention.

In some embodiments (i.e., FIGS. 2 and 7), the device is provided with more than one lower wheel 54, 56 and/or more than one upper wheel 50, 52. For instance, the particular example being shown having two upper wheels and two lower wheels. Obviously, a pair of upper wheels and a single lower wheel, a pair of lower wheels and a single upper wheel, etc. could be provided with the present invention.

The present invention could be combined with the teachings of the other embodiments (see my other patents/applications incorporated herein) thereby adding additional features to this embodiment including, but not limited to the use of a felt, etc.

One benefit of using such a belt system is the fact that it allows a mark to be made on both horizontal surfaces and vertical surfaces, thus making this embodiment able to work regardless of orientation.

While an "elastic" belt is preferred, a non-elastic belt could easily be used through use of a spring tensioning system (i.e., a tension hub, a living spring or some other means of tensioning the O-ring).

In the embodiment utilizing more than one lower wheel, the mark applicator is even more directional than using a single lower wheel and thus in its nature provides the ability to make a straighter and more perpendicular mark than using a single lower wheel.

An additional benefit of using this embodiment is that either a left-handed person or a right-handed person could equally use the present invention to apply a line to what is to be marked.

In use, the belt can be rolled along the surface, working as a directional marker as discussed in my prior applications thereby creating a line upon the surface to be measured and marked which is generally perpendicular to the first direction X.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. A marking tape measure comprising:
   a tape measure, said tape measure comprising a body having a front side and a bottom, said tape measure comprising a tape blade configured for extending from said front side in a first direction; and a marking device, said marking device comprising at least one upper post and at least one lower post, said marking device comprising a belt extending around said upper post and said lower post, said belt configured for being coated by said marking device with a powdered marking substance;

wherein contact of said belt to a surface to be marked thereby creates a mark upon said surface.

2. The marking tape measure of claim 1, wherein said belt is configured to roll along said surface generally perpendicular to said first direction thereby allowing said belt to make a directional mark upon said surface generally perpendicular to said first direction.

3. The marking tape measure of claim 1, wherein said marking device further comprises a pulley on at least one of said posts for assisting said belt in its rotation around said posts.

4. The marking tape measure of claim 3, wherein said belt is configured to roll along said surface generally perpendicular to said first direction thereby allowing a directional mark to be made upon said surface generally perpendicular to said first direction at a desired location.

5. The marking tape measure of claim 1, wherein said belt is elastic.

6. The marking tape measure of claim 1, wherein said marking device comprises a pair of upper posts and a pair of lower posts, said lower posts spaced apart laterally thereby enabling said belt to extend there-between said lower posts generally perpendicular to said first direction.

7. The marking tape measure of claim 1, wherein said belt is configured for traveling through a powdered marking substance chamber thereby picking up powdered marking substance thereupon said belt.

8. A marking tape measure comprising:

a tape measure, said tape measure comprising a body having a front side and a bottom, said tape measure comprising a tape blade configured for extending from said front side in a first direction; and a marking device, said marking device comprising at least one upper post and at least one lower post, said marking device comprising a belt extending around said upper post and said lower post, said belt configured to rotate around said posts, said belt configured for traveling through a powdered marking substance chamber thereby picking up powdered marking substance thereupon said belt;

wherein contact of said belt to a surface to be marked thereby creates a mark upon said surface.

9. The marking tape measure of claim 8, wherein said belt is configured to roll along said surface generally perpendicular to said first direction thereby allowing said belt to make a directional mark upon said surface generally perpendicular to said first direction.

10. The marking tape measure of claim 8, wherein said marking device further comprises a pulley on at least one of said posts for assisting said belt in its rotation around said posts.

11. The marking tape measure of claim 10, wherein said belt is configured to roll along said surface generally perpendicular to said first direction thereby allowing a directional mark to be made upon said surface generally perpendicular to said first direction at a desired location.

12. The marking tape measure of claim 8, wherein said belt is elastic.

13. The marking tape measure of claim 8, wherein said marking device comprises a pair of upper posts and a pair of lower posts, said lower posts spaced apart laterally thereby enabling said belt to extend there-between, said lower posts generally perpendicular to said first direction.

14. A marking tape measure comprising:

a tape measure, said tape measure comprising a body having a front side and a bottom, said tape measure comprising a tape blade configured for extending from said front side in a first direction; and a marking device, said marking device comprising at least one upper post and at least one lower post, said marking device comprising a belt extending around said upper post and said lower post, said belt configured to rotate around said posts, said belt configured for traveling through a powdered marking substance chamber thereby picking up powdered marking substance thereupon said belt;

wherein said belt is configured to roll along said surface generally perpendicular to said first direction thereby allowing a directional mark to be made by said belt upon said surface using generally perpendicular to said first direction at a desired location.

15. The marking tape measure of claim 14, wherein said marking device further comprises a pulley on at least one of said posts for assisting said belt in its rotation around said posts.

16. The marking tape measure of claim 15, wherein said belt is configured to roll along said surface generally perpendicular to said first direction thereby allowing a directional mark to be made upon said surface using said mark applicator generally perpendicular to said first direction at a desired location.

17. The marking tape measure of claim 14, wherein said belt is elastic.

18. The marking tape measure of claim 14, wherein said marking device comprises a pair of upper posts and a pair of lower posts, said lower posts spaced apart laterally thereby enabling said belt to extend there-between, said lower posts generally perpendicular to said first direction.

* * * * *